US008651709B1

(12) United States Patent
Yeh

(10) Patent No.: US 8,651,709 B1
(45) Date of Patent: Feb. 18, 2014

(54) MULTI-LEVEL LIGHT FIXTURE RETROFIT KIT

(76) Inventor: John Yeh, Riverside, CA (US)

( * ) Notice: Subject to any disclaimer, the term of this patent is extended or adjusted under 35 U.S.C. 154(b) by 221 days.

(21) Appl. No.: 13/242,040

(22) Filed: Sep. 23, 2011

(51) Int. Cl.

| | |
|---|---|
| ***B60Q 3/04*** | (2006.01) |
| ***F21V 15/00*** | (2006.01) |
| ***B60Q 1/00*** | (2006.01) |
| ***B60Q 3/00*** | (2006.01) |
| ***F21V 11/00*** | (2006.01) |

(52) U.S. Cl.
USPC .......... 362/368; 362/362

(58) Field of Classification Search
USPC .......... 362/368, 362
See application file for complete search history.

(56) References Cited

U.S. PATENT DOCUMENTS

| | | | |
|---|---|---|---|
| 5,716,125 A | 2/1998 | Aubrey | |
| 5,751,116 A | 5/1998 | Thomas et al. | |
| 6,739,734 B1 | 5/2004 | Hulgan | |
| 7,195,372 B2 | 3/2007 | Plunk | |
| 7,296,911 B2 | 11/2007 | Plunk et al. | |
| 7,311,425 B2 | 12/2007 | Jervey, III | |
| 7,845,832 B2 | 12/2010 | Boyer | |
| 8,066,391 B2 * | 11/2011 | Zhong | 362/20 |
| 2005/0276047 A1 * | 12/2005 | Barozzini et al. | 362/251 |
| 2010/0002411 A1 * | 1/2010 | Zhong | 362/20 |

* cited by examiner

*Primary Examiner* — Anh Mai
*Assistant Examiner* — Zachary J Snyder
(74) *Attorney, Agent, or Firm* — Eric Gani

(57) ABSTRACT

The present invention provides a multi-level light fixture retrofit kit 10 that can be easily attached to a parabolic reflector 54 of an existing HID light fixture 50. The retrofit kit 10 comprises of a frame 12 with four or more sides and a center opening 18. The center opening 18 can be secured and be suspended onto the parabolic reflector 54 with or without any mounting. Housing 20 with one or more lamp sockets 22 is disposed of on each side of the frame 12. The retrofit kit 10 also includes a partition 34 cutting across the frame 12 and held together by a hinge 36 on one end and by a locking mechanism 38 on the opposite end to facilitate installation and removal of the retrofit kit 10.

6 Claims, 4 Drawing Sheets

MULTI-LEVEL LIGHT FIXTURE RETROFIT KIT

TECHNICAL FIELD

The present invention relates generally to a light fixture and more particularly to a multi-level light fixture retrofit kit that can be attached to a parabolic reflector of an existing HID light fixture.

BACKGROUND OF THE INVENTION

In the lighting industry, one may hear the terms "high bay" and "low bay" lighting, which generally refers to the space and the height of the ceilings involved. There are no standard numerical value to define what constitute high bay or low bay. Typical definition found in the industry designated high bay to mean >20 feet and low bay to mean <20 feet off the floor. The terms high bay and low bay also refer to the fixtures designed for these applications, although it is not uncommon to see high bay fixtures in low bay applications, and vice versa. For simplicity purposes and within the context of this application, we shall refer to high bay and low bay as high ceilings and low ceilings respectively, along with the respective fixtures associated with these applications.

These high bay or low bay spaces are typically found in large indoor facilities such as factories, warehouses, large retail stores, athletic facilities or gymnasiums, etc. Lighting in these facilities has long been dominated by High Intensity Discharge (HID) lighting systems such as metal halide and high pressure sodium lamps. HID lamps are compact, rugged, powerful light sources, well suited for illuminating large indoor spaces with a crisp, white light. These systems are able to operate reliably in a wide range of ambient temperatures, with numerous fixtures specially designed to operate in demanding environments such as hazardous locations. However, HID lamps have a number of disadvantages. They have a slow warm up time and even slower to re-strike (turn on after being turned off). As such, they are unsuitable for frequent switching applications. They are not fully dimmable and do not offer multi level lighting. Most significantly, service life, light output and efficacy severely degrade over time.

New developments in fluorescent (T5/T8), LED and induction lighting technology have emerges that provide more advantages over HID systems. However, implementation of the newer technology entails a redesign of the entire lighting system or replacing the old fixtures and usually cannot be done in-house. This process is time consuming and labor intensive. Furthermore, the process requires closing down sections of the facilities during the construction, increasing the impact of the time and effort required to replace the old fixtures. Additionally, replacement of the old fixtures require disposal of the entire fixture, creating disposal costs and other issues.

Thus, there is a need for a light fixture retrofit kit that can be easily installed with a minimum amount of time and labor while providing the advantages of the newer, more energy efficient alternatives over HID systems. The multi-level light fixture retrofit kit disclosed in the present invention provide lighting upgrade that can be done in-house and as part of routine maintenance, making these easy, non-disruptive, low-risk investments with relatively quick payback rates.

SUMMARY OF THE INVENTION

The present invention is directed to a multi-level light fixture retrofit kit that can be easily attached to an existing high bay or low bay HID light fixture to provide additional lighting options and cost saving benefits. The preferred embodiment of the retrofit kit according to the present invention comprises of a frame with four equal sides and a center opening. However, it is to be understood that the frame according to the present invention can include four or more equal or unequal sides. A housing containing one or more lamp sockets is disposed of on each side of the frame and is adaptable for use with a variety of energy efficient lighting systems including but not limited to fluorescent, high output fluorescent, LED and induction lamps. The retrofit kit may also include a partition cutting across the frame and held together by a hinge or bracket on one end and a locking mechanism on the opposite end. The hinge and lock combination provides fast and easy installation and replacement of the retrofit kit.

HID lamps produce intense light in such a small area that they are considered "point sources". As a result, they are often installed in fixtures that direct their light using parabolic reflectors. The retrofit kit disclosed in the present application is designed to be easily attached to these reflectors to provide benefits that are not available with HID lighting systems. The center opening of the frame fits perfectly onto the parabolic reflector and can be suspended on the raised lip found in a typical reflector of a high bay or low bay HID light fixture. However, if desired, and for added safety, a number of flanges with mounting holes are disposed of around the perimeter of the center opening to allow mounting to the parabolic reflector using screws, nails or other fasteners and the like. The retrofit kit can also include a number of safety chains to be secured onto the ceiling to provide stability and as a safety precaution to prevent it from falling and causing injuries.

The retrofit kit taught in the present application provides additional light sources without the need for removal and disposal of the old light fixtures. In addition, the retrofit kit can accommodates the use of newer and more energy efficient lighting technology to deliver significant cost savings. Some of the additional benefits offered by the retrofit kit include the use of motion sensors, dimming and multi-level switching. These opportunities can translate into further significant additional energy cost savings.

The retrofit kit disclosed in the present application offer an instant on and off capability that is not possible with HID light. This opens up the opportunity to use motion sensors to maximize energy savings by ensuring that lights are on only when needed, particularly in warehouses and similar spaces that are often over-lit and under occupied. The retrofit kit is also relatively easy and inexpensive to dim which can be accomplished in two ways. First, the retrofit kit has multiple lamps which can be wired with multiple circuits to vary light levels, enabling multi-level switching or step dimming. Second, the retrofit kit can be equipped with dimming ballasts for continuous dimming. HID fixtures contain individual lamp, so they don't offer the first option. They cannot be completely dimmed, only to about 25-50 percent of their full output, and even then the dimming is not linear with the energy consumed so that in some cases very little energy is actually saved.

Lamp life is particularly important in high bay applications because the fixtures can be difficult to reach for maintenance. The retrofit kit disclosed in the present application may also offer a slight convenience advantage when it comes to changing lamps. If an HID lamp fails, a significant space will not have a sufficient light level. With the addition of the retrofit kit, when a lamp fails, the space will still receive light from the remaining lamps.

In view of the above disclosure, it is an object of the present invention to provide a multi-level light fixture retrofit kit that offer significant cost saving benefits.

Another object of the invention is to provide a multi-level light fixture retrofit kit that is easy to install and remove with a minimum amount of time and labor.

It is also an object of the present invention to provide a multi-level light fixture retrofit kit that can accommodates newer and more energy efficient lighting systems.

These and other objects of the invention will be made apparent to one of skill in the art upon a review of this specification, the associated drawings and the appended claims.

BEST MODES OF CARRYING OUT THE INVENTION

Figure 1:
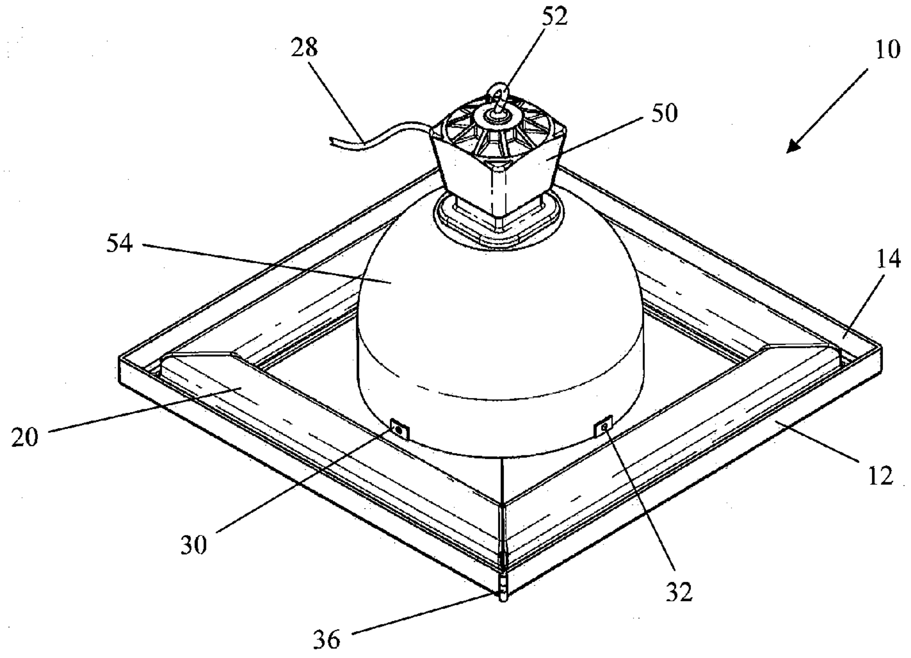
FIG. 1 is a top perspective view of one embodiment of the multi-level light fixture retrofit kit according to the present invention being attached to a parabolic reflector of an HID light fixture.

The best mode of carrying out the invention is presented in terms of a preferred embodiment of a multi-level light fixture retrofit kit 10 as shown in FIG. 1-7. In one embodiment, the multi-level light fixture retrofit kit 10 according to the present invention comprises of a frame 12 having a top surface 14, a bottom surface 16 and a center opening 18 extending from the top surface 14 to the bottom surface 16 of the frame 12. In an exemplary embodiment shown in FIG. 1-7, the frame 12 has four sides of equal length making it into a square shape. However, it is to be understood that the frame 12 according to the present invention can have four or more sides of equal or unequal length and can assume many different shapes including but not limited to a square, rectangular, pentagon, hexagon, and other polygonal shape.

Figure 2:
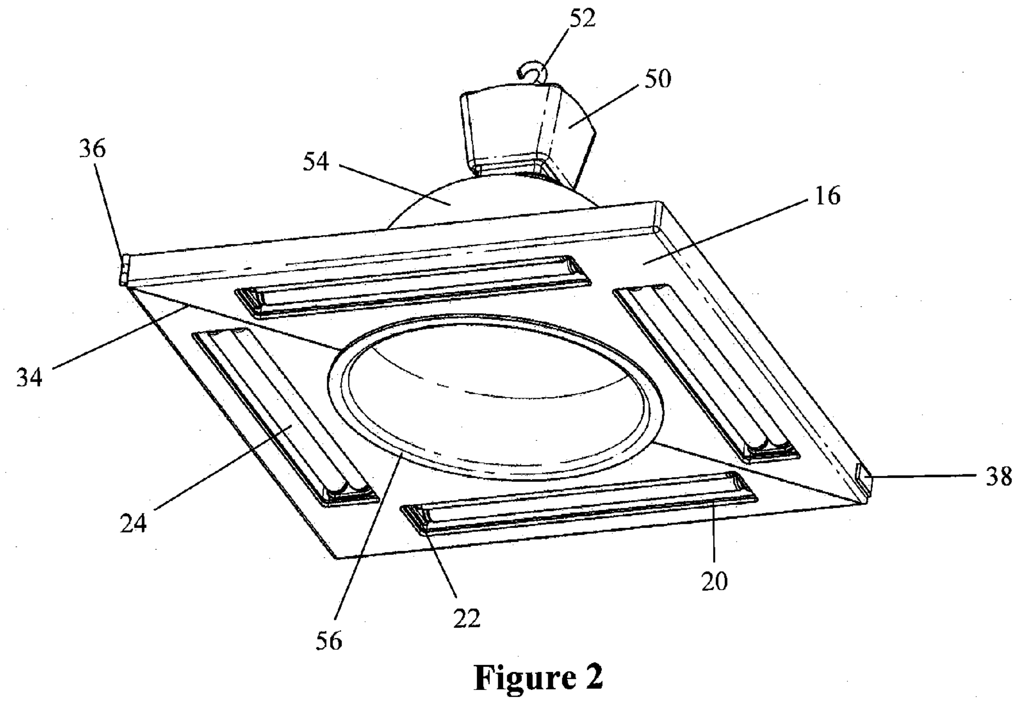
FIG. 2 is a bottom perspective view of one embodiment of the multi-level light fixture retrofit kit according to the present invention being attached to a parabolic reflector of an HID light fixture.
Figure 3:
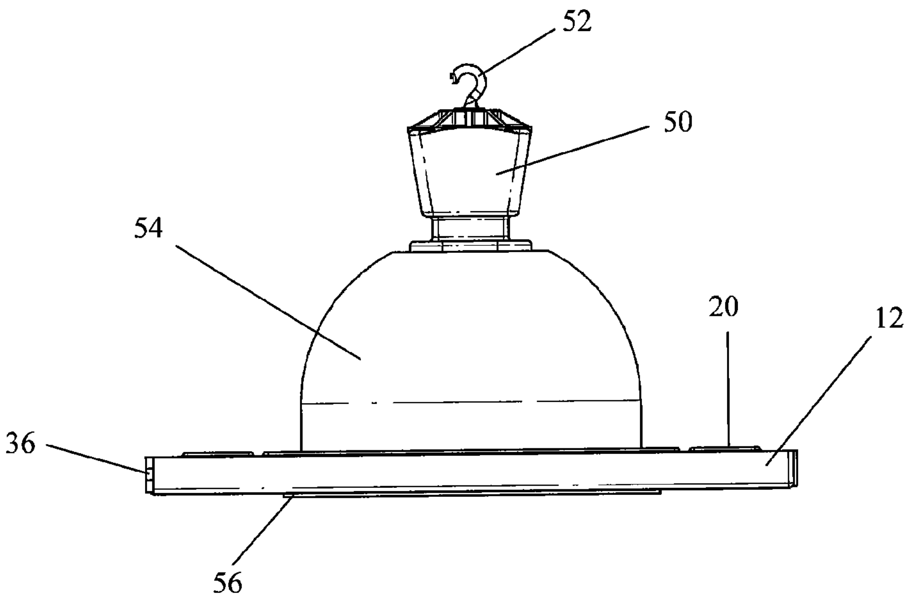
FIG. 3 is a side view of one embodiment of the multi-level light fixture retrofit kit according to the present invention being attached to a parabolic reflector of an HID light fixture
Figure 4:
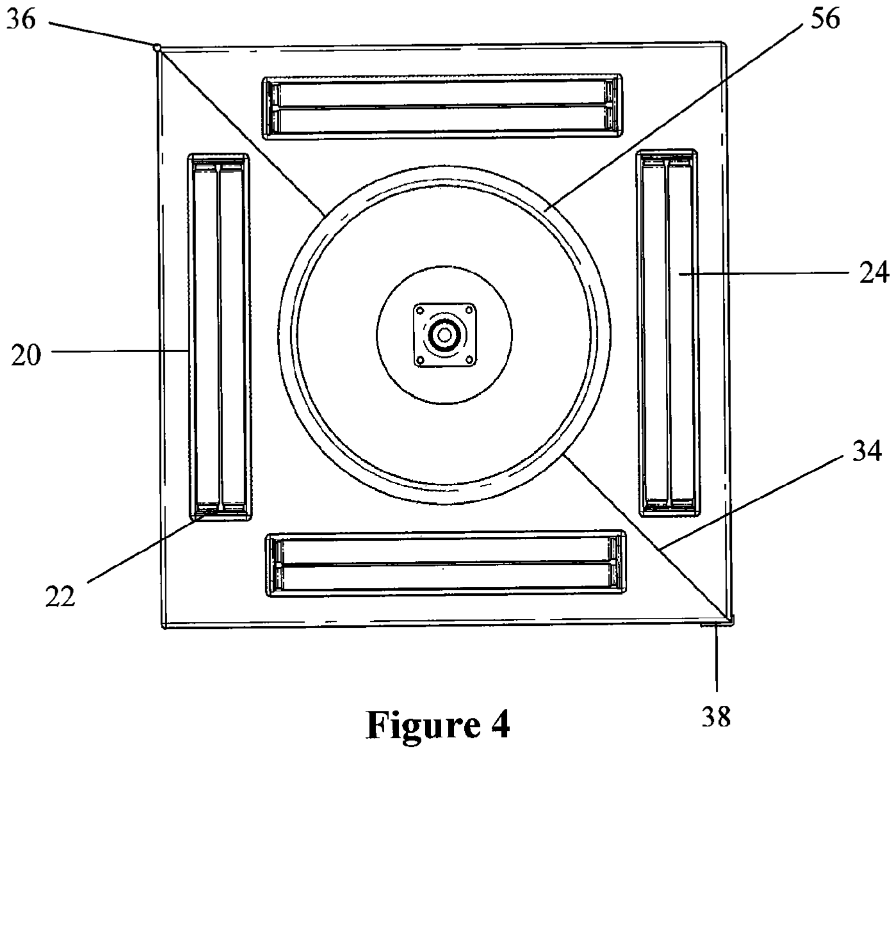
FIG. 4 is a bottom plan view of the multi-level light fixture retrofit kit according to the present invention.
Figure 5:
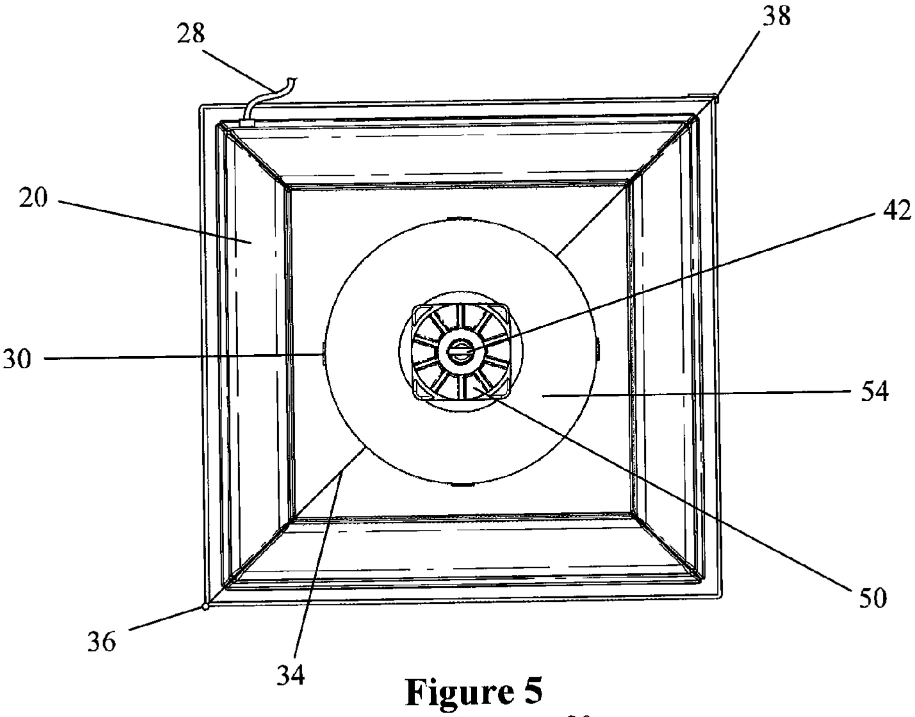
FIG. 5 is a top plan view of the multi-level light fixture retrofit kit according to the present invention.
Figure 6:
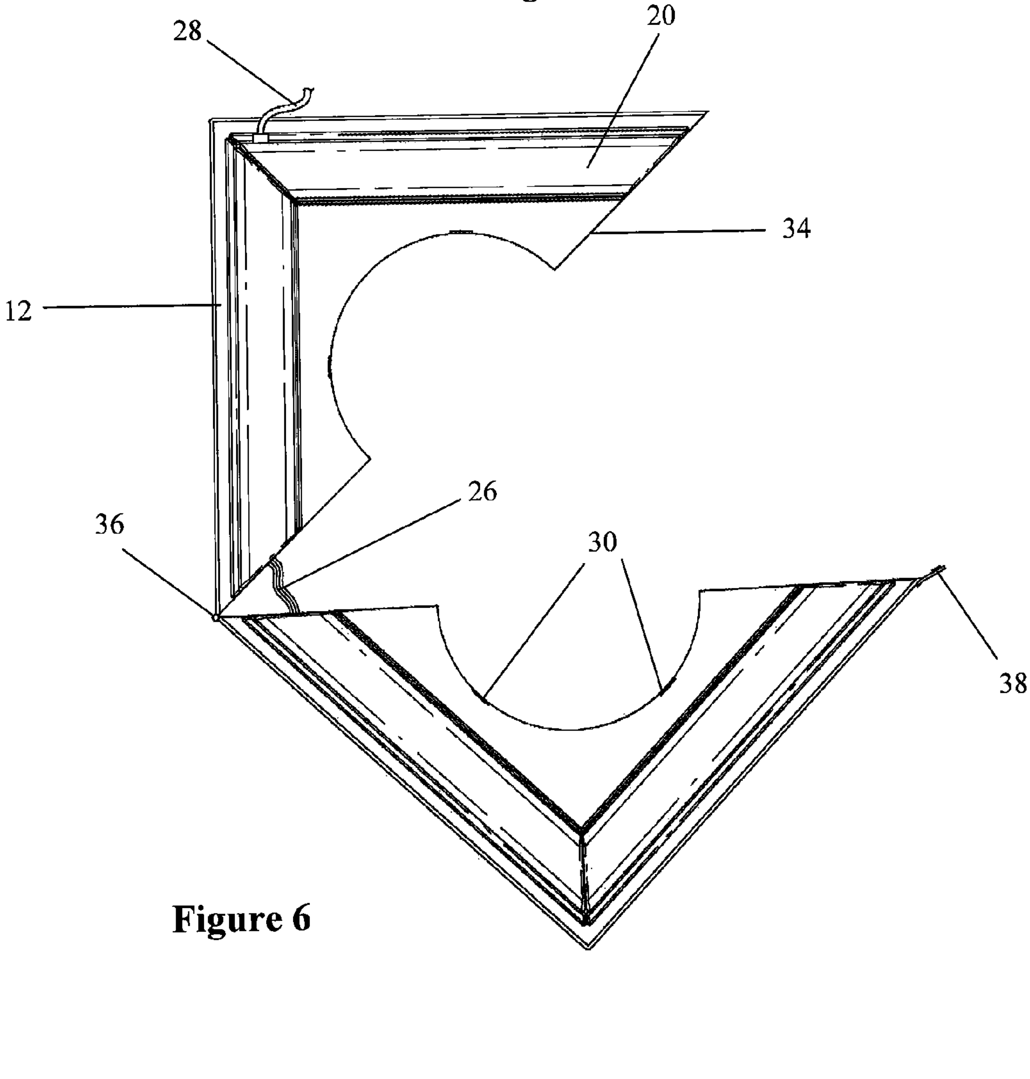
FIG. 6 is a top plan view of the multi-level light fixture retrofit kit according to the present invention in an open configuration

The center opening 18 of the frame 12 is designed to fit onto an existing parabolic reflector 54 found in a typical high bay or low bay HID light fixture 50. A typical parabolic reflector 54 used on a high bay or low bay HID fixture 50 has a raised lip 56 on the distal opening as shown in FIG. 2 and FIG. 4. In such case, the frame 12 is able to be secured and be suspended on the reflector 54 without requiring any additional mounting. However, the frame 12 includes a number of flanges 30 with mounting holes 32 disposed of around the perimeter of the center opening 18 to facilitate mounting to the parabolic reflector 54 via screws, nails or other fastening means. The center opening 18 is preferably circular, however, it can assume many different shapes to conform to any existing light fixture.

As shown in FIG. 1-2 and 4-7, the multi-level light fixture retrofit kit 10 according to the present invention has a housing 20 on each side of the frame 12 wherein each housing 20 contains one or more lamp sockets 22. FIG. 2 shows a frame 12 with four sides can have up to four housings 20, one on each side. Similarly, a frame 12 with six sides can have up to six housings 20 and so on. The housings 20 are compatible with newer and more energy efficient lamps 24 and can be wired with multiple circuits or equipped with dimming ballast (not shown) to provide multi-level switching or continuous dimming option. The ballast and wirings 26 for the light are concealed within the housing 20 by a back cover plate (not shown). The wirings 26 for each of the housing 20 are interconnected into a single electrical cord 28 disposed of in one corner on the top surface 14 of the frame 12 for connection to a power source.

The multi-level retrofit kit 10 may also includes a partition 34 cutting across the frame 12 and secured by a hinge or bracket 36 on one end and a locking mechanism 38 on the opposite end as shown in FIG. 2. Any known hinge or bracket 36 and locking mechanism 38 combinations can be utilized for the purpose of this invention to provide easy open and close operation of the frame 12. FIG. 2 shows one embodiment of the fixture according to the present invention where a hinge 36 is disposed of on one corner and a latch 38 is disposed of on the opposite corner.

Figure 7:
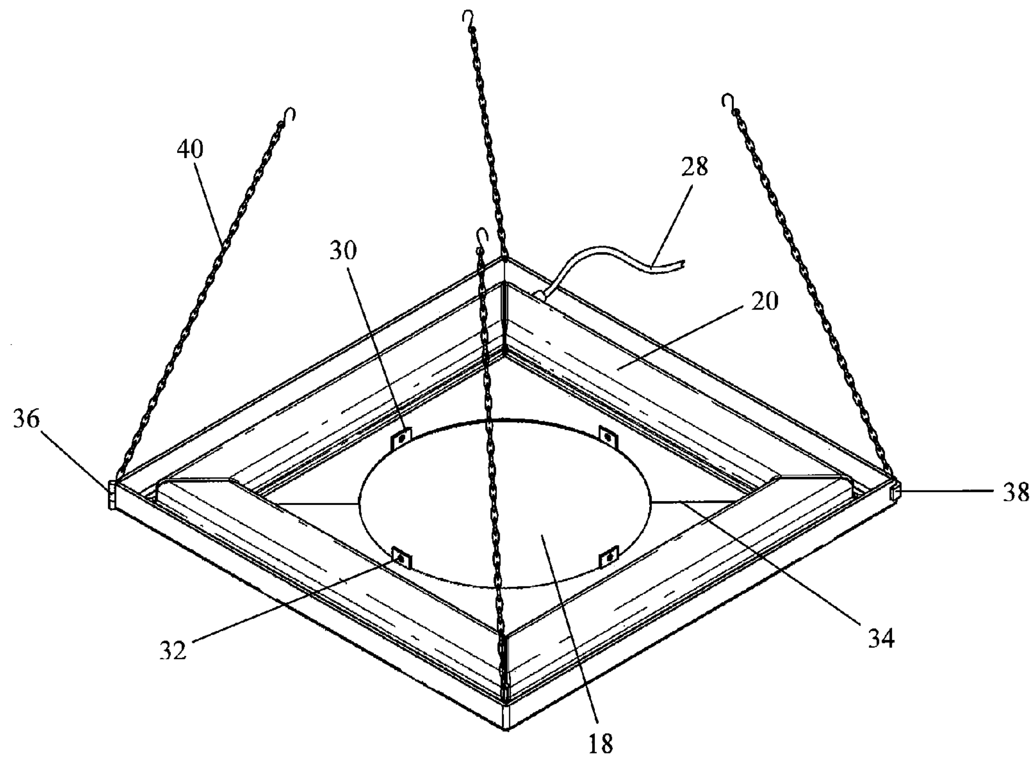
FIG. 7 is a top perspective view of the multi-level light fixture retrofit kit according to the present invention with the addition of safety chains

To install the frame 12 as an add-on onto an existing parabolic reflector 54, one simply unlock the latch 38 to open the frame 12 along its partition 34, fit the center opening 18 onto an existing reflector 54, close and lock the latch 38 to secure the frame 12 in place. As mentioned earlier, a parabolic reflector 54 of a high bay or low bay HID fixture 50 typically has a raised lip 56 at the distant opening. In this situation, one can see the benefit of having the partition 34 for easy installation and replacement of the frame 12. In such case, once the frame 12 is locked in place, it will be able to be suspended on the reflector 54 without requiring any additional mounting. However, when the reflector 54 does not have a raised lip 56 or if one desire, a number of flanges 30 with mounting holes 32 are disposed of on the perimeter of the center opening 18 to facilitate mounting to the reflector 54 via screws, nails, or other fasteners and the like. In such case where the reflector 54 does not have a raised lip 56, it will not be necessary for the frame 12 to have a partition 34 as one can easily align the center opening 18 of the frame 12 with the reflector 54, slide it to a desired position and securely mount it in place. In addition, the retrofit kit 10 can also include a number of safety chains 40 being attached to the frame 12 on one end and to the ceiling on the other end for stability and as a safety precaution to prevent it from falling and causing injuries. FIG. 7 shows one embodiment of the retrofit kit 10 according to the present invention with four safety chains 40, one on each corner of the frame 12.

The multi-level light fixture retrofit kit 10 according to the present invention provides several advantages. It is easy to install and uninstall without the need for additional mounting. It provides additional light sources when needed. It can be configured to use with all types of lighting systems including but not limited to fluorescent, high output fluorescent, LED, and induction lighting technology. It is suitable for both high bay and low bay applications. Most importantly, it provides cost savings in a number of ways. First, it allows the use of a more energy efficient lighting system. Since the energy efficient light typically also have a longer life, this in turn will reduce maintenance cost. Second, it provides immediate start and restart (instant re-strike) whereas HID lamps are slow to start and even slower to re-start. This allows the use of motion sensor where light can be turned off when there is no one in the area and instantly turned back on when someone enters the area. Third, it can be wired with multiple circuits to offer multi-level switch capability where the lamps can be turned on and off one lamp at a time. Fourth, it can be equipped with dimming ballast to vary the light output by continuous dimming.

To provide further cost saving benefits, one may also wish to replace the high bay/low bay light from HID system into a more energy efficient lighting system including but not limited to fluorescent, LED, or induction lighting system. In this case, one can install a low wattage energy efficient lamps on the retrofit kit 10 and have it constantly turn on to provide light source at all time and utilize a motion sensor for the main light that has been replaced with energy efficient lamp to provide additional light source when needed.

Although the invention has been described in some detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A multi-level light fixture retrofit kit comprised of:

a) a frame having a top surface, a bottom surface and a center opening extending from the top surface to the bottom surface thereof, wherein said frame has four or more equal or unequal sides, b) a housing disposed on each side of said frame, wherein said housing have one or more lamp sockets, c) an electrical wiring disposed on the housing wherein said wiring is interconnected onto a single electrical cord extending from the top surface of said frame for connection to a power source, and d) a partition cutting across the frame wherein said partition is held together by a hinge on one end and a locking mechanism on the opposite end, said retrofit kit is removably attached to a parabolic reflector of an existing HID light fixture.

2. The multi-level light fixture retrofit kit as specified in claim 1 wherein said frame further includes a number of flanges with mounting holes disposed around the perimeter of said center opening to facilitate mounting of the frame onto the reflector.

3. The multi-level light fixture retrofit kit as specified in claim 1 wherein said center opening is circular.

4. The multi-level light fixture retrofit kit as specified in claim 1 wherein said housing is used with a variety of energy efficient lighting system such as fluorescent, high output fluorescent, LED, or induction.

5. A multi-level light fixture retrofit kit used as an attachment to a reflector of an existing HID light fixture, said retrofit kit comprised of:

a) a frame having a top surface, a bottom surface and a center opening extending from the top surface to the bottom surface thereof, wherein said frame has four or more equal or unequal sides, b) a housing disposed on each side of said frame, wherein said housing have one or more lamp sockets, c) an electrical wiring disposed on the housing wherein said wiring is interconnected onto a single electrical cord extending from the top surface of said frame for connection to a power source, d) a partition cutting across the frame wherein said partition is held together by a hinge on one end and a locking mechanism on the opposite end, and e) a number of safety chains to secure the frame on the existing light fixture and provide stability.

wherein said center opening has a number of flanges with mounting holes to secure the frame onto the reflector.

6. A multi-level light fixture retrofit kit used as an attachment to a reflector of an existing HID light fixture, said retrofit kit comprises of:

a) a frame having a top surface, a bottom surface and a center opening extending from the top surface to the bottom surface thereof, wherein said frame has four or more equal or unequal sides, b) a housing disposed on each side of said frame, wherein said housing have one or more lamp sockets, c) an electrical wiring disposed on the housing wherein said wiring is interconnected onto a single electrical cord extending from the top surface of said frame for connection to a power source, d) a partition cutting across the frame wherein said partition is held together by a hinge on one end and a locking mechanism on the opposite end, and e) a number of safety chains to secure the frame on the existing light fixture and provide stability, wherein said center opening is removably secured and is suspended on a raised lip of said reflector.

* * * * *